Jan. 16, 1968     P. GARBATI     3,363,527
APPARATUS FOR MAKING PANORAMIC PHOTOGRAPHS
Filed July 9, 1965
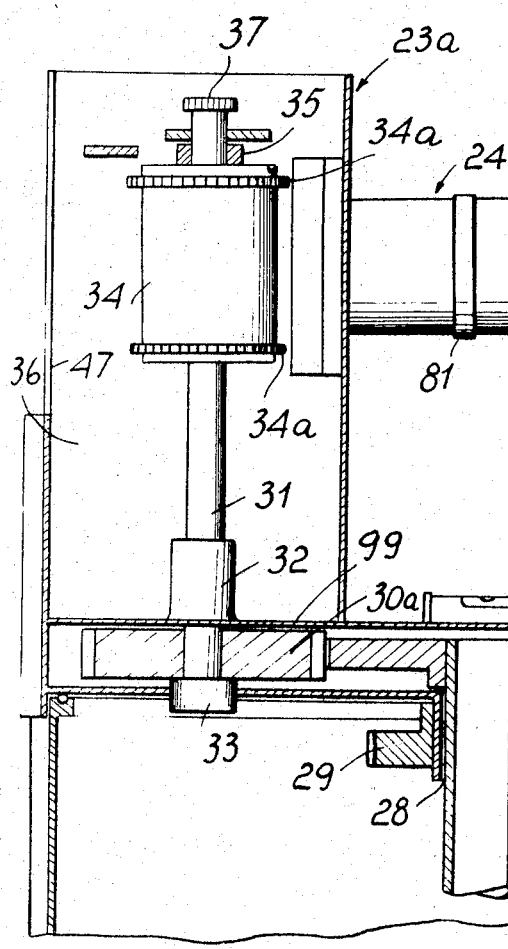
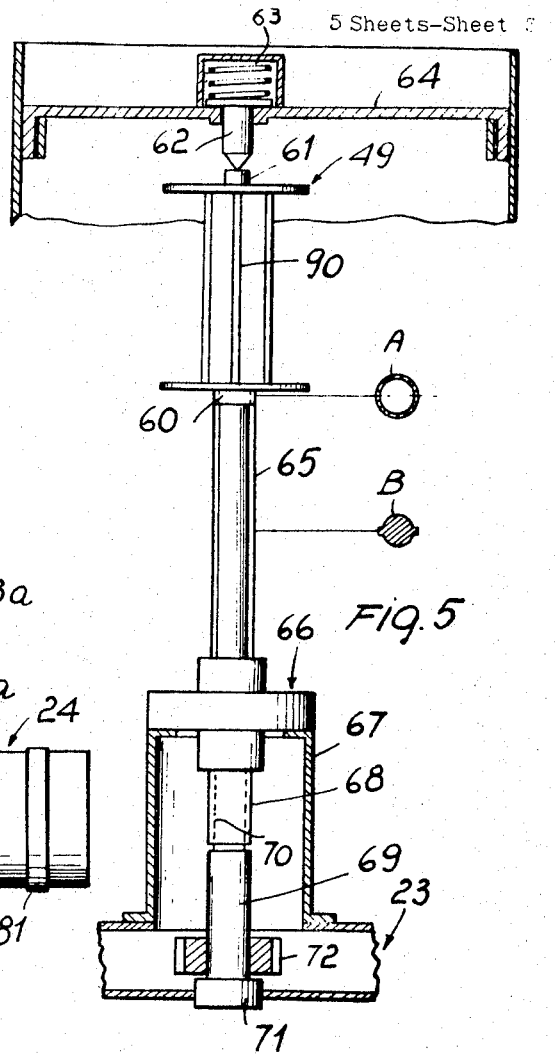
INVENTOR.
PAOLO GARBATI
BY Steinberg & Blake
attys.

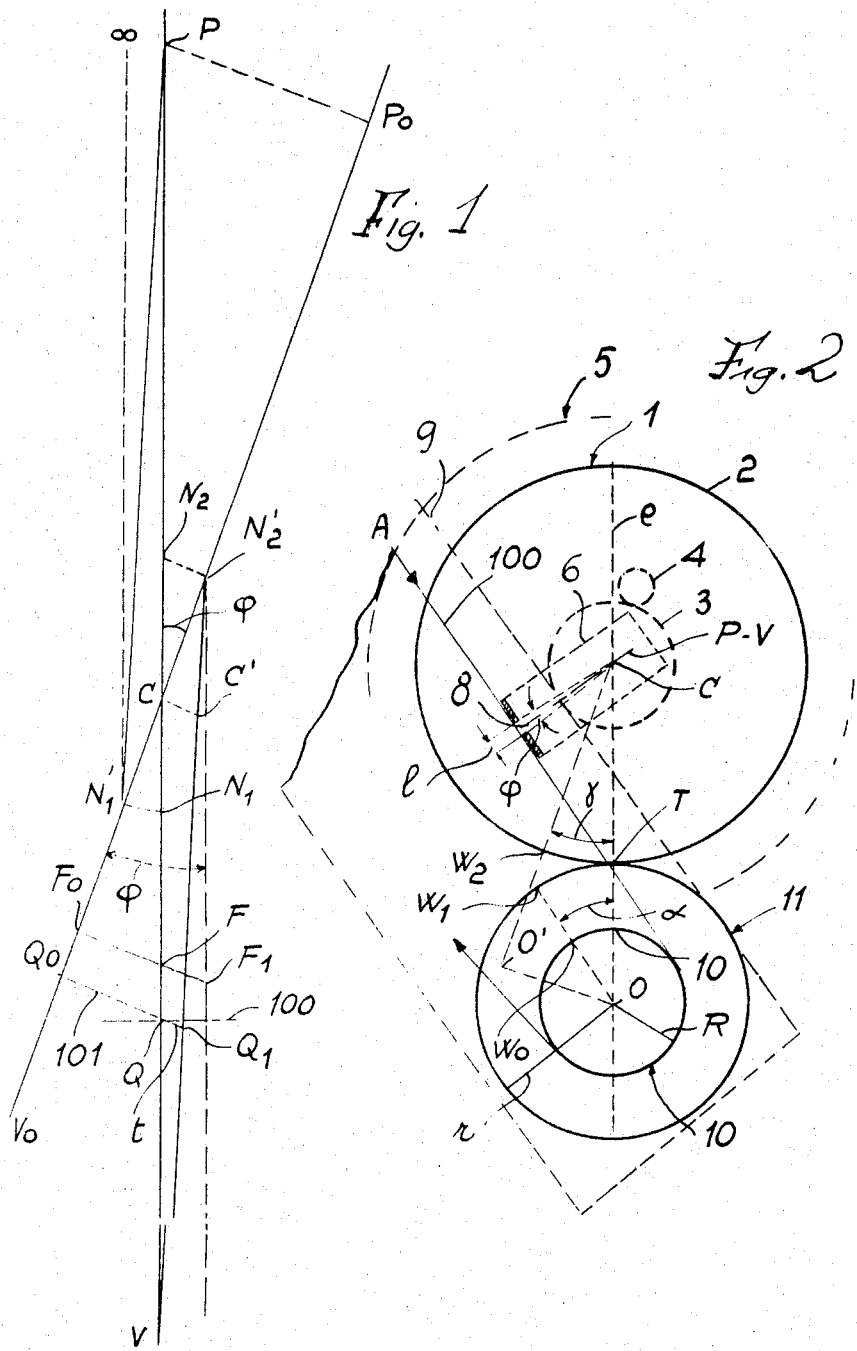

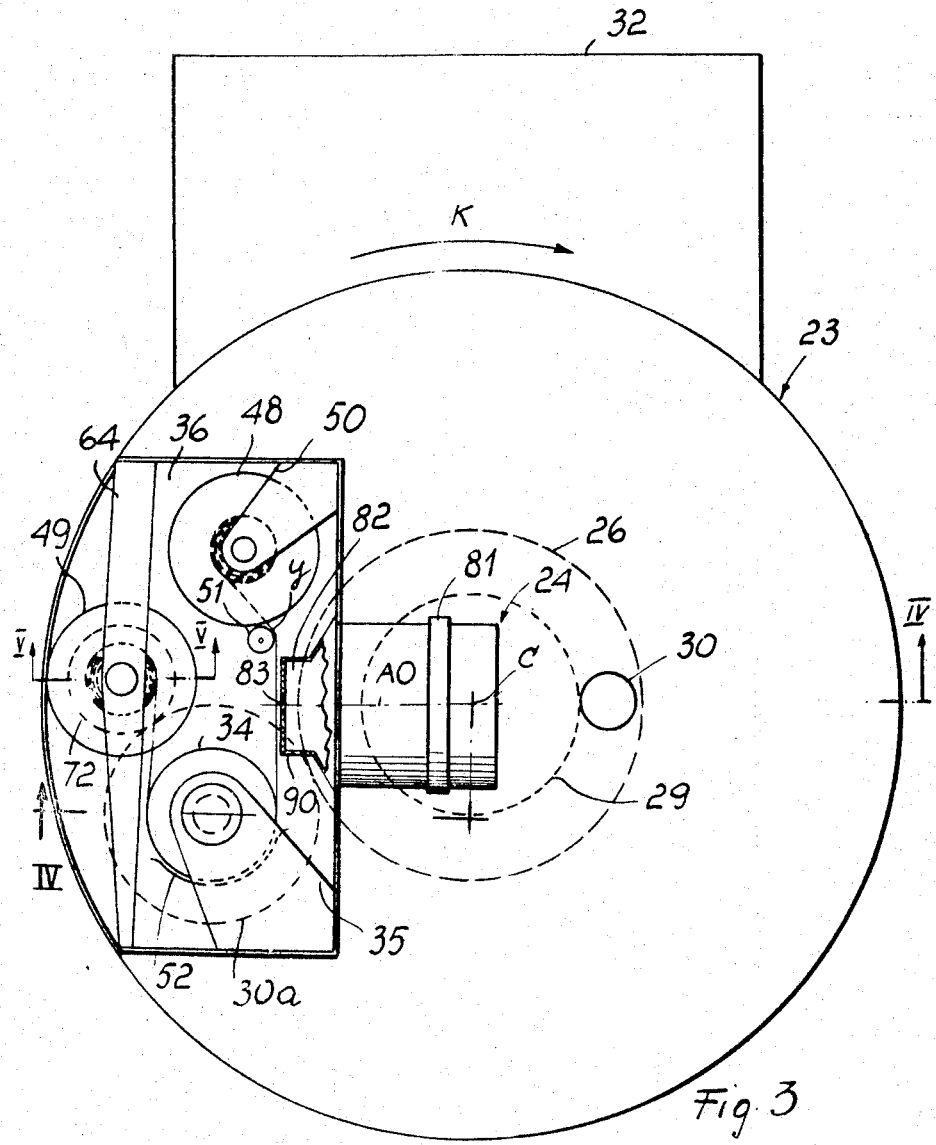

Jan. 16, 1968   P. GARBATI   3,363,527
APPARATUS FOR MAKING PANORAMIC PHOTOGRAPHS
Filed July 9, 1965   5 Sheets-Sheet 4
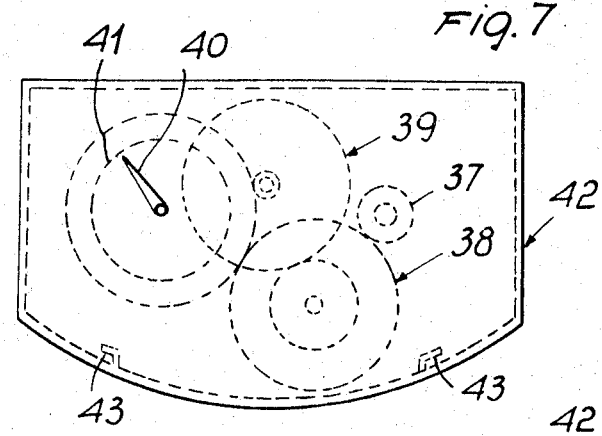
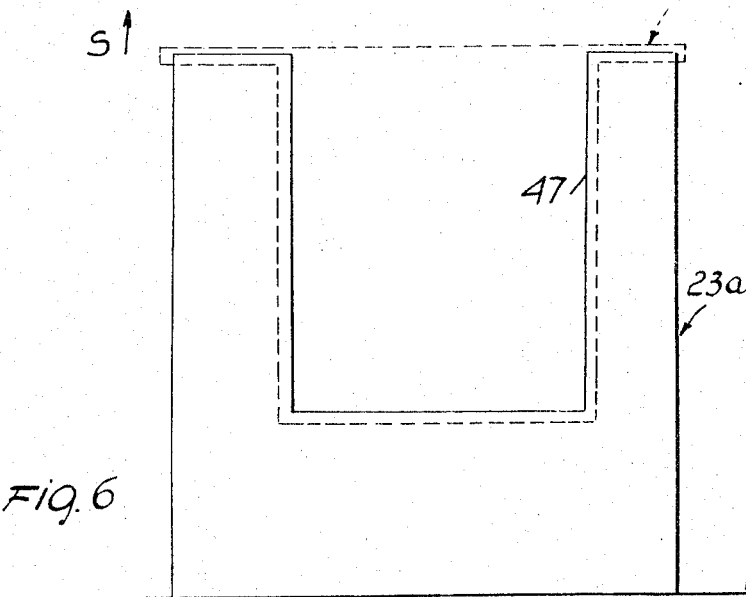
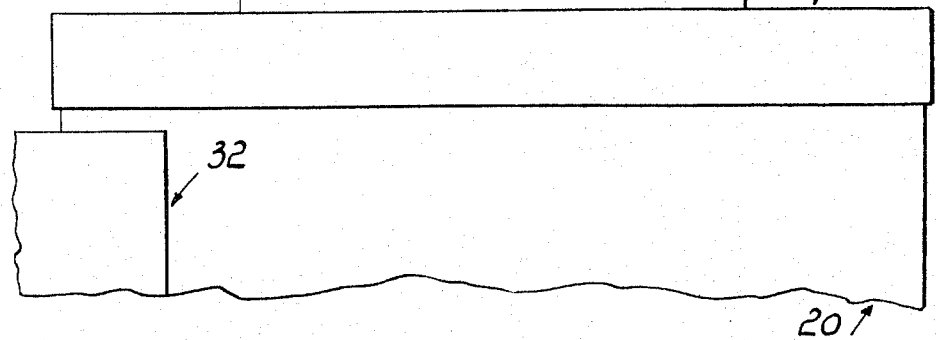
INVENTOR.
PAOLO GARBATI
BY Steinberg & Blake
attys.

Jan. 16, 1968  P. GARBATI  3,363,527
APPARATUS FOR MAKING PANORAMIC PHOTOGRAPHS
Filed July 9, 1965  5 Sheets-Sheet 5
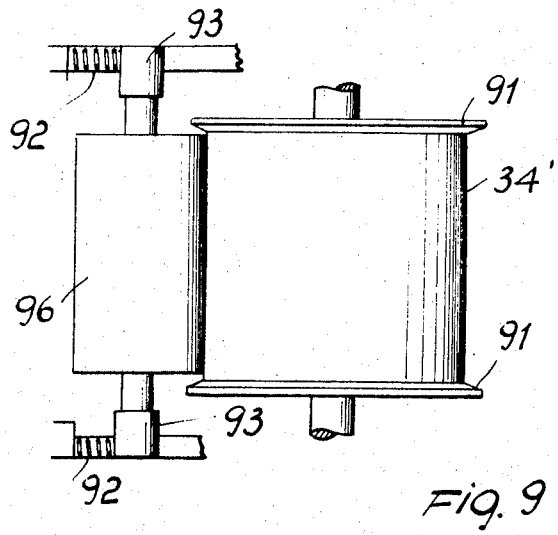
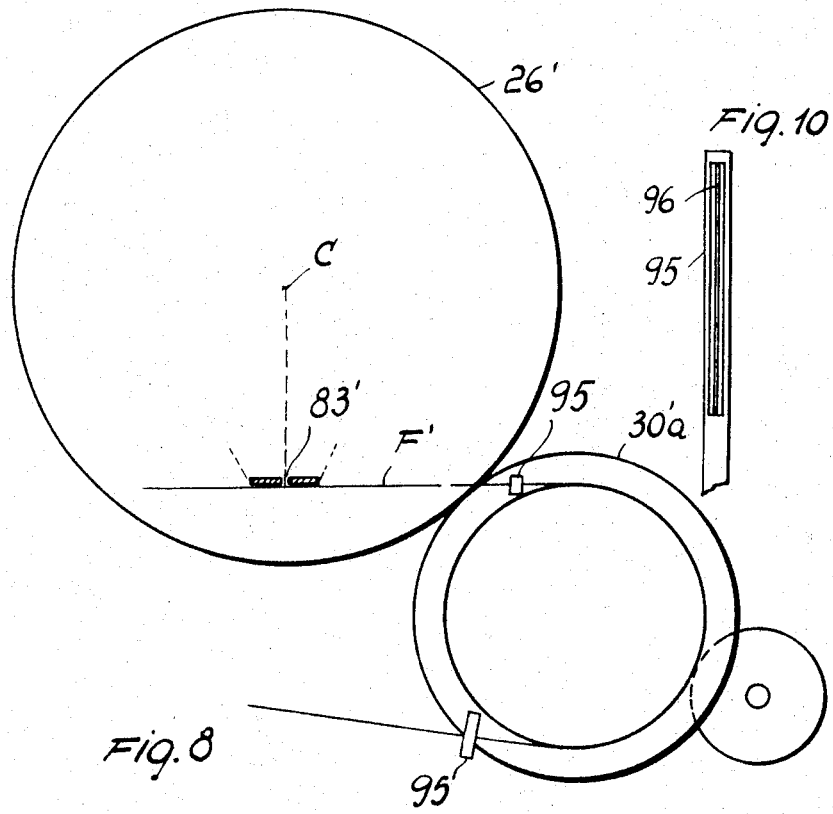
INVENTOR.
PAOLO GARBATI
BY Steinberg & Blake
attys

United States Patent Office 3,363,527
Patented Jan. 16, 1968

3,363,527
APPARATUS FOR MAKING PANORAMIC PHOTOGRAPHS
Paolo Garbati, 37 Via Sonnino, Cagliari, Italy
Filed July 9, 1965, Ser. No. 470,820
Claims priority, application Italy, July 14, 1964, 684,227
4 Claims. (Cl. 95—15)

The present invention relates to photographic apparatus.

More particularly, the present invention relates to structure for making panoramic photographs.

One of the primary objects of the present invention is to provide a photographic apparatus capable of making panoramic photographs of the highest quality while at the same time being of an extremely simple construction which is very easy to operate.

In particular, it is an object of the invention to provide for a photographic apparatus which makes panoramic photographs a camera which does not require any shutter.

Also, it is an object of the present invention to provide a photographic apparatus of the above type capable of automatically transporting the film in a manner which compensates for turning of the camera in azimuth during exposure of the film, so as to prevent any relative movement between the object which is photographed and the image thereof which is impressed on the film.

Furthermore, it is an object of the invention to provide an apparatus capable of making panoramic photographs extending through any desired angle about a given axis without limiting the exposures to film frames of a given length, so that with the structure of the present invention the length of film which is continuously exposed will be determined solely by the angle in azimuth through which the camera is turned while making a panoramic photograph, and thus it is possible with the present invention to provide a continuous film frame extending without interruption through 360°, if necessary.

Furthermore, it is an object of the invention to provide a structure of the above type in which the film itself is very easy to insert and remove from the camera as well as very reliably handled within the camera.

Also, the objects of the present invention include a method of making panoramic photographs according to which it is possible to continuously transport the film while the camera is panned about a predetermined axis of rotation.

The method and apparatus of the present invention lend themselves to use for all photogrammetric and photo-topographic purposes, and in addition the apparatus of the invention can have many other uses such as the making of photographs for advertising purposes, for post-cards, photographing indoor and room areas, as well as photographs of archaeological discoveries, photographs of ceremonies, of large groups of persons, and photographs which will provide a permanent record of automobile accidents, air crashes, and identification for legal or police purposes. Therefore, it is apparent that the apparatus of the present invention is primarily intended for professional purposes, although certainly use of the structure by amateurs is not excluded.

According to the invention, a shutter-less camera is provided at the rear of its objective and along the optical axis thereof with a gate through which film in the camera is exposed during movement of the film by a film-transporting means past the film gate. A support means is provided to support the entire camera for rotary movement about a predetermined axis of rotation which is normal to the optical axis of the objective of the camera, and in accordance with the present invention a means is provided for transporting the film at a speed which will automatically compensate for the movement of the camera about the axis of rotation in such a way as to prevent any relative movement between the object which is photographed and the image thereof which is impressed on the film while continuously transporting the latter. Thus, according to the method of the invention the film is continuously transported while the camera is turned in azimuth about the axis of rotation which is normal to the optical axis so as to make the panoramic exposure.

The invention is illustrated by way of example in the accompanying drawings which form part of the application and in which:

FIG. 1 is a graphic representation of the principles on which the present invention is based;

FIG. 2 is a diagrammatic plan view schematically illustrating the manner in which one possible embodiment of a structure according to the present invention operates according to the principles demonstrated in connection with FIG. 1 to achieve the results of the present invention;

FIG. 3 is a schematic partly sectional top plan view of an actual structure according to the present invention;

FIG. 4 is a fragmentary transverse section of the structure of FIG. 3 taken along line IV—IV of FIG. 3 in the direction of the arrows;

FIG. 5 illustrates the manner in which a film spool is mounted, and FIG. 5 also is a fragmentary sectional elevation, FIG. 5 being taken along line V—V of FIG. 3 in the direction of the arrows;

FIG. 6 is a fragmentary rear elevation of the structure of FIG. 3 wherein the camera closing elements are indicated in dotted lines;

FIG. 7 is a top plan view of the camera housing showing the structure which closes the camera as well as the film counting structure;

FIG. 8 is a diagrammatic plan view of another embodiment of a film transporting means;

FIG. 9 is a fragmentary side elevation showing details of the film transporting means of FIG. 8; and FIG. 10 is a fragmentary elevation showing the details of a film guiding structure used in connection with the embodiment of FIGS. 8 and 9.

The optical and geometric principles on which the present invention is based are illustrated in FIG. 1. The vertical straight line shown in FIG. 1 extending through the points P and V represents the optical axis of an objective which has the nodal points $N_1$ and $N_2$, this objective having a second focal point F situated on the optical axis at the location illustrated in FIG. 1.

It is assumed that the objective can be turned about an axis perpendicular to the plane of FIG. 1 and intersecting the optical axis PV at the point C, the axis of rotation which intersects the optical axis at C of course being normal to the optical axis. Also, it is assumed that either a section of photographic film or a focusing screen 100 is fixed with the objective so as to extend normally across the optical axis which is intersected by the film 100 at the point Q, and thus the point Q represents that point along the optical axis where an image of the point P will be provided. Also, it is assumed that the section $\overline{CN_2}$ is positive when the nodal point $N_2$ is at a greater distance from the image Q than the point C, while the section $\overline{N_1N_2}$ is positive when the nodal point $N_2$ is more distant from the image Q than the nodal point $N_1$. Of course, the object is represented by the point P and the point Q represents the image of the object.

By making:

$$\overline{N_1P}=p$$

$$\overline{N_2Q}=q$$

and $$\overline{N_2F} = f$$

then there is an already known valid lens relation according to which:

$$q = \frac{pf}{p-f}$$

Assuming now that the optical axis PV is rotated about the axis of rotation which is perpendicular to the plane of FIG. 1 and intersects the optical axis at C in a clockwise direction until the optical axis reaches the position PoVo, and assuming moreover that the angle of rotation $\varphi$ is extremely small, for example on the order of 1–2 degrees, then the following simplifications can be accepted:

$$\sin \varphi = \varphi; \quad tg\ \varphi = \varphi \quad (\varphi \text{ expressed in radians})$$

After the objective has been turned in the above-described manner so as to situate the optical axis along the line PoVo, the several points Q, F, $N_1$ and $N_2$ will be respectively situated at Qo, Fo, $N'_1$ and $N'_2$, and at the same time the image of the point P has shifted from the point Q to the point $Q_1$.

Because of the extremely small size of the angle $\varphi$, it can reasonably be assumed that straight lines perpendicular to the axis PoVo and intersecting the points Qo, Fo, $N'_1$ and $N'_2$ in the plane of FIG. 1 will respectively pass through the points Q and $Q_1$, F, $N_1$, and $N_2$. These straight perpendicular lines are indicated by dotted lines in FIG. 1. Therefore, it can be assumed that the image plane 100, which of course remains perpendicular to the optical axis during the turning thereof, when it takes the position 101 will contain all three of the points Qo, Q and $Q_1$.

Therefore, as was indicated above, when the optical axis PV has been turned through the angle $\varphi$, the image Q of the point P has been shifted to the location $Q_1$, and such shifting of the image from Q to $Q_1$ has the magnitude indicated by the section $t$, and this is referred to as "dragging" of the image. The magnitude of the segment $t$ is considered positive when the dragging of the image takes place in a direction opposed to the direction of turning of the objective.

FIG. 1 illustrates various similar triangles from which it is possible to derive various relationships. Thus, considering the similar triangles CC'V and $QQ_1V$, $PCN'_1$ and $VCN'_2$, $N'_2N_2V$ and CC'V, certain geometrical relationships can be obtained which, when compared with each other, lead to the following expression of $t$:

(1)

$$t = \frac{p \sin \varphi (\overline{pCN_2} - f\overline{N_2N_1})}{(p-f)(p \cos \varphi + [\overline{N_1N_2} - \overline{CN_2}][1 - \cos \varphi])}$$

The above formula, assuming an extremely small angle of rotation, can be simplified as follows:

(2)

$$t = \frac{\varphi(\overline{pCN_2} - f\overline{N_1N_2})}{p^2 - f}$$

wherein $\varphi$ is expressed in radians.

As a result of the rotation of the optical axis from its initial position PV to the position PoVo, with respect to an observer whose position does not change, the image Q of the point P has been displaced with respect to the optical axis through the distance $\overline{QoQ_1}$. Therefore, in order to impress on a photographic film, for example, an image of a predetermined object, it is essential that, while the optical axis is rotated, the film be transported through the distance $\overline{QoQ_1}$. In other words, it is essential to provide structure by which the film, or the image plane, can be shifted through the distance $\overline{QoQ_1}$, simultaneously with the rotation of the optical axis.

Referring again to FIG. 1, and still assuming that the value of the angle $\varphi$ is extremely small (on the order of only a few degrees, as pointed out above), the following relationship is obtained:

(3) $\quad \overline{QoQ_1} = (CQ \cdot \varphi) + t = (q - \overline{CN_2})\varphi + t$ In particular, if the object P is situated at infinity, in the direction $\infty$ shown in FIG. 1, then the image thereof would be situated at $F_1$ on the focal plane, and because of the small value of the angle $\varphi$, it can be assumed as lying on the line FoF which is perpendicular to the rotated optical axis PoVo. In this case, in order to prevent a relative movement between the object which is photographed and the image thereof which is impressed on the film, it is necessary to move the film by the distance:

(4) $\quad FoF_1 = f\varphi$

Of course, it is apparent that the extent of shifting of the film, or of the image plane with respect to the objective, must always be the same, irrespective of whether the object which is photographed is situated at infinity or is relatively close to the camera, so that the same structure can be utilized to photograph objects which are relatively near to the camera as well as objects at infinity.

Therefore, it is essential that $\overline{QoQ_1} = \overline{FoF_1}$, and therefore (5) $\quad (q - CN_2)\varphi + t = f\varphi$ in which, after the value of $t$ is introduced, according to Equation 1, and by assuming that $\sin \varphi = \varphi$, the following relationship is derived:

(6)

$$\frac{f^2}{p-f} + \frac{p(pCN_2 - fN_1N_2)}{(p-f)(p \cos \varphi + [\overline{N_1N_2} - \overline{CN_2}][1 - \cos \varphi])} = CN_2$$

which, after development, provide the following quadratic equation:

(7) $\overline{CN_2}(p-f)(1 - \cos \varphi) - \overline{CN_2}[(1 - \cos \varphi)(p\overline{N_1N_2} - f\overline{N_1N_2} + f^2 - p^2) - pf \cos \varphi] + f^2\overline{N_1N_2}(1 - \cos \varphi) + pf^2 \cos \varphi - pf\overline{N_1N_2} = 0$ This equation when solved provides two roots of which that having the greatest absolute value is discarded (inasmuch as it has no practical value), while the other root $\overline{CN_2}$ represents the distance at which the nodal point $N_2$ must be situated from the axis of rotation which intersects the optical axis at the point C, as functions of $p$ (assuming $\varphi$ and the distance $\overline{N_1N_2}$ as constant).

Therefore, after having established the position of the point C, the distance $\overline{N_1N_2}$ and the angle $\varphi$, the motion of the optical system with respect to the point C, for focussing, should conform to the relationships resulting from Equation 7.

With the above assumptions having been made, the Equation 7 can be simplified as follows, inasmuch as $\cos \varphi$ can be made equal to 1:

(7a) $\quad \overline{CN_2} = \overline{N_1N_2} - f$

On the basis of this latter expression, after having established $\overline{N_1N_2}$ and $f$ of the objective, the position of the point C is also established. When these conditions are met there is no relative movement of the film with respect to the object which is photographed irrespective of the distance between this object and the film.

While the above considerations are of a theoretical nature, they do provide a better understanding of the principles on which the camera according to the present invention is based. Referring now to FIG. 2, the structure of the present invention conforming to the above principles is diagrammatically illustrated. In FIG. 2, there is a stationary supporting structure 1 such as a suitable stand or tripod, and this supporting structure carries a stationary gear 2 (of which only the pitch circle is illustrated) situated at the upper end of the supporting structure 1. The center of the stationary gear 2 determines the point C which is situated in the axis of rotation which coincides with the axis of the stationary gear 2.

Situated beneath the fixed gear 2 is an additional gear 3 which is coaxial with the gear 2 and which meshes with the pinion 4 driven from any suitable source of power. The gear 3 is connected with a rotary assembly 5 which is supported by the supporting structure 1 in such a way as to be able to rotate about the axis of rotation which intersects the optical axis at the point C. This assembly 5 includes the objectives 6 which can be of any suitable well known type so that the objective 6 rotates with the assembly 5. The distance between the point C and the nodal point $N_2$ is equal to the distance which is calculated according to the Formula 7a. The optical axis PV of the objective 6 of course passes through the point C and is normal to the axis of rotation of the assembly 5, this latter axis of rotation also passing through the point C.

The objective 6 forms part of a camera, which forms part of the assembly 5, and this camera includes behind the objective 6 a film gate 8 in the form of an elongated slit the length of which is equal to the width of the film strip, this slit-shaped film gate extending across the film strip as will be apparent from the description which follows. Of course, the optical axis passes through the gate 8, and the width of the gate 8 is one millimeter. The objective 6 and the exposure gate 8 are carried by a camera housing 9 which is secured to and forms part of the rotary assembly 5.

As is indicated diagrammatically in FIG. 2, the film strip 100 is transported along the interior of the camera housing 9. This film is unwound from a suitable supply spool and is guided on suitable unillustrated rollers so as to be transported in the direction of the arrow A. The film strip moves past the gate 8, in the focal plane, to a film-transporting sprocket 10, and after passing about the film-transporting sprocket 10 the film continues to a take-up spool, in the direction of the arrow indicated at the lower left portion of FIG. 2. The supply and take-up spools as well as the film guiding and transporting structure all situated within the camera housing 9 which of course is sealed in a light-tight manner from the outer atmosphere. It can be assumed that the film is provided with perforated edges whose perforations are spaced according to the distance between the teeth of the sprocket 10 so that when the latter turns it will transport the film.

The sprocket 10 has coaxially fixed thereto a transmission means formed by a gear 11, and this gear 11 is freely turnable with respect to the camera housing 9 and meshes with the stationary gear 2.

Assuming now that the radius of the stationary gear 2 is $\rho$, that the radius of the film-transporting means 10 is R, that the radius of the transmission means 11 is r, then when the entire assembly 5 is turned about the axis of rotation which intersects the optical axis at the point C, the common axis O of the sprocket 10 and the gear 11 is shifted to the location O'. At the same time, of course, the sprocket 10 and the gear 11 turn in a clockwise direction, as viewed in FIG. 2, about the common axis of the sprocket 10 and gear 11, and the film 100 is therefore transported in the direction of the arrow A. Assuming that the assembly 5 turns through an angle $\gamma$ so that the common axis O of the sprocket 10 and gear 11 will shift to the location O', then the point of tangency T will be formed by the meeting of the points $W_1$ and $W_2$. This is the point of tangency between the gears 2 and 11. Simultaneously the sprocket 10 and the gear 11 have turned through the angle $\alpha$ about their common axis O, so that the film is transported by a linear distance which is equal to the length of the arc $W_oT_o$. By utilizing the relationship shown in Equation 5 and by making $s=$arc $TW_1$ and $TW_1$ and $S=$arc $T_oW_o$, the following relation is obtained:

$$S = R\alpha = \frac{1\gamma}{r} \cdot R$$

Inasmuch as transportation of the film is required to prevent any relative movement between the object photographed and the image thereof which is impressed on the film, both of the Equations 3 and 5 must be satisfied. By making suitable substitutions, there is obtained:

(8)
$$\frac{\rho}{f} = \frac{r}{R}$$

thus establishing the relationship between the focal distance and the magnitudes of the cooperating elements, so as to provide film transportation which satisfies this equation in order to prevent any relative motion between the image projected onto the film and the film itself.

Of course, the value of $\varphi$ can be obtained from FIG. 2. This value appears in FIG. 1 as well as in all of the formulae derives therefrom where the sine may be $$= \frac{1}{CB}$$

with a sufficient approximation, when the width of the slit which forms the gate is 1 mm.—i.e. sine $$\varphi \cong \frac{1}{CB}$$

where B is the intersection of the optical axis with the vertical center line of the gate 8.

Thus, from the above considerations the structural relationships have been derived which when satisfied will eliminate any relative motion between the object which is photographed and the image thereof which is impressed onto the film.

The remaining figures of the drawing show details of an actual construction which conforms to the principles demonstrated in FIG. 1 and described in a more structural manner with respect to FIG. 2.

As is indicated in FIGS. 4 and 6, one possible embodiment of an actual construction according to the invention will include a base structure 20 which, as is already known in topographic instruments, can be situated on a suitable tripod. In particular the base 20 can be supported on the tripod by three micrometer screws capable of being adjusted so as to situate the base 20 in a perfectly level attitude, as indicated by the spirit level 21 shown in FIG. 4. The base 20 carries a ball bearing 22 at its upper periphery, and on this ball bearing 22 is supported a rotary head 23 which forms part of a support means for supporting the rotary part of the assembly for rotary movement. The rotary head 23 carries the camera housing 23a, corresponding to the camera housing 9 of FIG. 2, and the camera housing 23a carries the objective 24 which of course corresponds to the objective 6 of FIG. 2. Within the housing 23a are situated the supply spool and take-up spool as well as the film guiding and transporting structure, as pointed out below.

Situated within the base 20 and also forming part of the stationary base structure is a hollow shaft 25 which fixedly carries a gear 26 so that this gear 26 is stationary, and thus it will be seen that this gear 26 corresponds to the gear 2 of FIG. 2. Beneath the gear 26 the stationary hollow shaft 25 is surrounded by a depending sleeve 27 which is integral with the rotary head 23 and which is supported for rotary movement on the stationary shaft 25 by means of a bronze bearing 28 which directly surrounds the shaft 25 and is surrounded by and engages the sleeve 27.

The sleeve 27 fixedly carries a gear 29, which corresponds to the gear 3 of FIG. 2, and this gear 29 meshes with a pinion 30 driven from any suitable source of power such as an electric motor, a spring motor, or even a manual crank drive, the source of power being situated within an enclosure 32 designated in FIG. 3 and secured to the base 20. Thus, the pinion 30 corresponds to the pinion 4 of FIG. 2.

The stationary gear 26 meshes with a motion-transmitting means formed by a rotary gear 30a, and of course the gear 30a corresponds to the gear 11 of FIG. 2. This gear 30a is fixed to a coaxial shaft 31 which extends into the interior of the camera housing 23a and which is supported for rotary movement by a pair of bearings 32 and 33 which are respectively carried by the upper and lower walls of the hollow rotary head 23. This shaft 31 fixedly carries the sprocket 34 which forms the film-engaging member of the film transporting means, and of course the sprocket 34 corresponds to the sprocket 10 of FIG. 2. The sprocket 34 is provided with the sprocket teeth 34a which project in a well known manner into the film perforations for transporting the film. This sprocket 34 is of course of a conventional construction currently used in all film cameras for the transportation of perforated film.

The shaft 31 is supported at its upper end for rotary movement in a suitable bearing carried by a bracket 35 fixed to the inner surface of the outer wall structure of the camera housing 23a and situated in the interior 36 of the camera housing, the film being transported in the interior 36 of the camera housing.

Referring now to FIGS. 4 and 7, the shaft 31 carries at its upper end a pinion 37 which is fixed to the shaft 31 and which meshes with a gear 38 (FIG. 7) which forms part of a gear train which includes also a gear 39 for transmitting the rotation of the shaft 34 to a pointer 40 which cooperates wtih a counting scale 41 indicates the number of feet of film which remain to be exposed. Of course, the scale can be arranged to indicate the number of feet already exposed. All of the elements 38–41 are rotatably carried by a removable cover 42 capable of being mounted on and removed from the camera housing 23a. Suitable guides 43, diagrammatically indicated in FIG. 7, are provided to guide the depending rear portion of the cover 42 for vertical movement along the rear wall of the camera housing 23a, so that the rear depending portion of the cover 42 will assume the dotted line position indicated in FIG. 6, and when this cover assembly 42 is mounted on the camera housing the interior thereof is closed in a light-tight manner. When the cover is removed the rear opening 47 will be uncovered so that free access may be had to the supply and take-up spools in the interior of the camera housing, as described below. At the places where the edges of the cover assembly 42 and camera housing 23a engage each other, a suitable labyrinth structure is provided to guarantee light-tightness of the interior of the camera.

The supply spool 48 (FIG. 3) is removably carried by a suitable structure mounted on a bracket 50, this structure having for example the details described below in connection with FIG. 5 where the structure as used for the take-up spool may also be used for the supply spool. The bracket 50 is also secured to the wall of the housing 23a in the interior chamber 36 thereof.

The film strip y is unwound from the supply spool 48 and passes about a guide roller 51 which is supported for free rotary movement in the hollow interior 36 of the camera housing, before reaching the film transporting sprocket 34 from which the film travels to the take-up spool 49. The guide roller 51 and the sprocket 34 form a film transporting means which acts on the film to guide the latter along a straight path perpendicular to the optical axis behind the film gate, and it will be noted that the axis of the guide roller 51 is parallel to the axis of the sprocket 34. Moreover it will be noted that the sprocket 34 is fixed directly to the rotary gear 30a by the shaft 31 so that the sprocket 34 and the gear 30a rotate together.

Situated within the camera housing is a curved film-guiding wall 52 of channel-shaped configuration partly extending about and spaced slightly from the exterior surface of the sprocket 34 so as to cooperate therewith for guiding the film around the sprocket. This arched guide 52 can also be supported by the bracket 35, and of course the curvature of the guide 52 is the same as that of the sprocket 34 and has its axis coinciding with that of the sprocket 34. The angle through which the guide 52 extends is sufficient to prevent disengagement of the film from the film-transporting means 34.

The take-up spool 49 is situated within the chamber 36 in such a way that it can be easily removed therefrom. For this purpose the structure shown in FIG. 5 may be used. The bottom flange of the spool 49 can have fixed thereto a hollow depending sleeve 60 having the configuration shown at A and formed at opposed longitudinal surface portions in its interior with a pair of axial grooves capable of receiving the opposed longitudinal ribs of a rotary drive shaft 65 having the cross sectional configuration B which mates with the interior cross sectional configuration of the sleeve 60. The top flange of the spool 49 carries a pin 61 formed at its upper face with a conical depression receiving the pointed end of a pin 62 pressed downwardly by a spring 63 situated in a suitable housing carried by a fixed transverse wall 64 of the camera housing, so that in this way the force of the spring 63 acts through the pin 62 on the spool 49 to urge the latter downwardly, as viewed in FIG. 5. The pin 62 extends slidably through a suitable opening formed in the transverse wall or cross bar 64 which extends across the chamber 36.

The shaft 65 is the output shaft of an overrunning clutch mechanism 66 which produces a one-way drive in a manner well known, so that only one direction of the shaft 65 and the spool 49 is possible for winding the film thereon. The overrunning clutch 66 is carried by a support 67 mounted on the rotary head 23, and the input shaft 68 of the clutch 66 is drivingly coupled with a drive shaft 69 by way of a friction sleeve 70 which is fixed to the input shaft 68 and which frictionally surrounds and engages a portion of the shaft 69 so as to transmit rotation of the shaft 69 to the clutch assembly 66 while at the same time permitting slippage of the drive where necessary, as the diameter of the film wound onto the spool 49 increases. The friction sleeve 70 may be made of rubber or other suitable material having a high coefficient of friction.

The drive shaft 69 is supported for rotation in a bearing 71 carried by the rotary head 23 and this drive shaft 69 fixedly carries a pinion 72 which meshes with the gear 30a (FIG. 3).

Therefore, in order to remove the take-up spool 49 from the chamber 36, after the cover assembly 42 has been removed, it is only necessary to displace the spool 49 upwardly in opposition to the force of the spring 63 through a distance sufficient to enable the sleeve 60 to clear the top end of the shaft 65, and then the spool can be very easily removed.

As pointed out above, the very same structure may be used for the supply spool 48 except that the components 66 and 72 may of course be omitted. However, in the case of the supply spool the force with which the spring 63 urges the pin 62 against the pin 61 at the top flange of the supply spool is greater than in the case of the take-up spool so as to provide a greater braking action as, for example, by increasing the area of contact between the pin 62 and the pin 61.

Naturally, known structure may be used to support the spools, but the above structures are preferred because of their simplicity and reliability. Thus, the supply and take-up spools may be conventional and supported in a conventional manner, and also a pressure plate which is conventional and unillustrated may be used to press the film against the film gate as it slides therealong during exposure of the film, all in a manner well known in the art.

The objective 24 is provided with a rotary focussing ring 81 accessible to the operator for focussing the objective, and the objective is carried by the front wall of the camera housing 23a. The objective 24 is conventional and any conventional light measuring structure may be used for setting the exposure aperture either automatically or to indicate what manual setting should be provided for a given film speed.

Of course, the rear end of the objective 24 communicates with a light-tight light guides 82 which guides the light which passes through the objective to the gate 83 in the form of an elongated slit formed in an opaque wall, extending vertically, in a direction perpendicular to the plane of FIG. 3, and having its central axis intersected by the optical axis AO. The width of the narrow slit which forms the gate 83 may be on the order of 1 or 2 millimeters, as has already been pointed out above. Of course, the length of the gate 83 is equal to the width of the film strip.

Of course, the radii of the gears 26 and 30a as well as the sprocket 34, and the focal length of the objective 24 will all have with respect to each other the relationship indicated in Equation 8.

The above-described apparatus for making panoramic photographs operates as follows:

In order to load the camera, the cover 42 is removed in the direction of the arrow S indicated in FIG. 6, so that the interior of the chamber 36 is freely accessible. A supply spool 48 of unexposed film is inserted and the leading end of the film is passed around the guide roller 51 past the gate 83, between the latter and an unillustrated pressure plate, and then onto the teeth of the sprocket 34 between the latter and the film guide 52. At this time the rotary head 23 can be manually turned in the direction of the arrow K (FIG. 3) so as to drive the sprocket 34 until the leading end of the film issues from the space between the sprocket 34 and the guide 52. The operator continues to turn the rotary head 23 until there is a sufficient length of film available to insert the leading end of the film into the slot 90 (FIG. 5) of the take-up spool 49, so as to connect the leading end of the film to the take-up spool in this way. The take-up spool 49 is then mounted in the camera, and by utilizing the drive from the shaft 69 the spool 49 can be driven through the friction sleeve 70, and in this way the film can have its slack taken up. Then the cover 42 is replaced and the driving motor is made ready for operation. In the case of a spring motor, for example, the motor may be wound up.

In the event that the film which is exposed does not have perforations, use may be made of the film guiding and transporting structure shown in FIGS. 8–10. In this case the film transporting means 34' is in the form of a friction member which transports the film by frictional engagement therewith. The film engaging member 34' has end flanges 91 of frustoconical configuration. This member 34' is driven in precisely the same way as the sprocket 34. The film is pressed against the rotary member 34' by a pressure roller 96 supported for rotation in bearings 93 which are slidable in suitable guides and which are acted upon by the springs 92 so as to maintain the pressure roller 96 urged toward the film transporting means 34'. As may be seen from FIG. 8, the film F' will be transported past the film gate 83', and before and after it engages the rotary film transporting member 34' the film passes through guides 95 each of which can have the construction shown in FIG. 10. Each guide 95 is in the form of a stationary member formed with an elongated slit 96 through which the film F' passes, and these guides 95 may be supported by the bottom wall 99 (FIG. 4) of the camera housing.

As is apparent from the above description, the camera of the present invention does not include a shutter inasmuch as the length of the frame which is exposed at any one time is determined by the continuous transportation of the film past the film gate during simultaneous rotation of the entire assembly about the axis of rotation which is normal to the optical axis. Also, the use of a viewfinder is not essential inasmuch as photos extending along the entire horizon do not require framing in a viewfinder before the exposure is made. If desired, however, a simple, tiltable and removable viewfinder, provided with a suitable scale of angular graduations, can be used when it is desired to photograph only a portion of the entire horizon.

With respect to exposure times, the particular exposure time is not critical if it is less than a given value such as, for example, 1/100 sec. However, exposure times on the order of 1/30 sec. are preferred, so as to achieve a smoother transportation of the film. It is to be noted that the term "exposure time" in the case of the camera of the invention designates the time required for a point on the film to move through a distance equal to the width of the gate.

Of course, while a structure as described above is preferred because of its relative simplicity, it is possible to provide one motor for rotating the head 23 while the film transportation is derived from a separate motor, and in this case, which is far more complex than that described above, the operation of the film transporting structure must of course be synchronized with the rotary movement of the head 23.

Thus, it will be seen that with the method and apparatus of the invention it is possible to continuously transport the film while turning the entire assembly about an axis which is normal to the optical axis so as to provide a panoramic photograph free of any possibility of relative movement between the object which is photographed and the film which receives an image thereof. Moreover, the camera of the invention is very easy to load and unload, is composed only of relatively simple, rugged elements, and is very reliable in operation.

What is claimed is:

1. Apparatus for making panoramic photographs, comprising a camera having an objective and behind said objective a film gate through which the optical axis of said objective passes and through which film in the camera is exposed, support means for supporting said camera for turning movement about an axis of rotation normal to said optical axis, a stationary gear having an axis coinciding with said axis of rotation, a rotary film-engaging member carried by said camera in the interior thereof for engaging and transporting film therein during rotation of said rotary film-engaging member, said rotary film-engaging member having an axis parallel to said axis of rotation, and a rotary gear carried by said support means also for turning movement about said axis of rotation, said rotary gear meshing with said stationary gear and being coaxially connected with said film-engaging member for rotating the latter in response to turning of said camera about said axis of rotation, the point of intersection between said optical axis and axis of rotation, the focal length of said objective, and the radii of said stationary gear, rotary gear, and film-engaging member all having with respect to each other a relationship which prevents any relative movement between the object which is photographed and the image thereof which is impressed on the film, the ratio of the radius of said stationary gear with respect to the focal length of said objective being equal to the ratio of the radius of said rotary gear with respect to the radius of said film-engaging member, and the point of intersection between said axis of rotation and said optical axis being situated at a distance from one of the nodal points of said objective which is equal to the difference between the total distance between both nodal points of said objective and the focal length thereof.

2. Apparatus as recited in claim 1 and wherein a film transporting means, which is formed in part by said rotary film-engaging member acts on the film to transport the latter along a straight path perpendicular to the optical axis behind said film gate.

3. Apparatus as recited in claim 2 and wherein said rotary gear which is coaxially connected with said film-engaging member is directly connected thereto so that said film-engaging member and said rotary gear rotate together.

4. Apparatus as recited in claim 3 and wherein said rotary film-engaging member is a sprocket and said transporting means including in addition to said sprocket a guide roller having an axis parallel to the axis of said sprocket and coacting therewith for transporting the film along said straight path.

References Cited

UNITED STATES PATENTS

| | | | |
|---|---|---|---|
| 621,545 | 3/1899 | Stark | 95—15 X |
| 673,461 | 5/1901 | Thomson | 95—15 |
| 1,503,437 | 7/1924 | James | 95—15 |
| 2,966,096 | 12/1960 | D'Incerti | 95—15 X |
| 3,142,237 | 7/1964 | Waroux | 95—15 |

JOHN M. HORAN, *Primary Examiner.*